US007093669B2

(12) United States Patent
Walsh

(10) Patent No.: US 7,093,669 B2
(45) Date of Patent: Aug. 22, 2006

(54) IMPACT TOOL

(75) Inventor: Leonard M. Walsh, Forestville, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/624,752

(22) Filed: Jul. 22, 2003

(65) Prior Publication Data

US 2004/0129437 A1 Jul. 8, 2004

Related U.S. Application Data

(60) Provisional application No. 60/319,413, filed on Jul. 22, 2002.

(51) Int. Cl.
*B23P 19/04* (2006.01)

(52) U.S. Cl. ....................... 173/90; 173/91; 173/162.2; 254/104; 254/131

(58) Field of Classification Search .................. 173/90, 173/91, 210, 162.2, 162.1; 254/104, 131
See application file for complete search history.

(56) References Cited

U.S. PATENT DOCUMENTS

| | | | | | |
|---|---|---|---|---|---|
| 299,086 | A | * | 5/1884 | Over | 173/90 |
| 3,050,095 | A | * | 8/1962 | Prather | 144/195.5 |
| 3,712,389 | A | * | 1/1973 | Smoak | 173/126 |
| 4,681,171 | A | * | 7/1987 | Kee et al. | 173/90 |
| 4,924,056 | A | | 5/1990 | Bevilacqua | |
| 5,088,174 | A | * | 2/1992 | Hull et al. | 29/254 |
| 5,323,519 | A | * | 6/1994 | Cloud | 29/254 |
| 5,398,773 | A | * | 3/1995 | Baker | 173/90 |
| 5,495,878 | A | * | 3/1996 | McKenen, Jr. | 144/195.5 |
| 5,542,479 | A | * | 8/1996 | Stachler et al. | 173/90 |
| 5,845,719 | A | * | 12/1998 | Matsumoto et al. | 173/114 |
| 6,035,946 | A | * | 3/2000 | Studley et al. | 173/90 |

* cited by examiner

*Primary Examiner*—Scott A. Smith
(74) *Attorney, Agent, or Firm*—Bachman & LaPointe, P.C

(57) ABSTRACT

An impact tool, comprising: a shaft; a stop on the shaft; a slider movable on the shaft for striking the stop to create an impact force; and a handle on the slider to allow a user to move the slider. The handle isolates the impact force from the user by being movably attached to the slider.

17 Claims, 4 Drawing Sheets

IMPACT TOOL

CROSS-REFERENCE TO RELATED APPLICATIONS

This Application claims the benefit of U.S. Provisional Patent Application No. 60/319,413, filed on 22 Jul. 2002, herein incorporated by reference.

BACKGROUND OF THE INVENTION

This invention relates to an impact tool. Specifically, the present invention relates to an ergonomic impact tool.

Impact tools, such as dent pullers, have a variety of uses. As one example, an impact tool can assist with the disassembly of an industrial gas turbine (IGT) during an overhaul. During an overhaul, a technician must remove the various flanges from the outside of the case. However, the heat and expansion cycles encountered during use of the IGT can make the removal of these flanges difficult. One conventional method uses an impact tool to dislodge the flanges from the IGT case.

Despite using the impact tool, removing the flanges can prove difficult. The technician often must actuate the impact tool a significant number of times (e.g. 20–80) to dislodge the flange. Repeating this process for each flange on the IGT case (e.g. 6 flanges per case) could take approximately one hour.

The use of conventional impact tools has several drawbacks. First, conventional impact tools the impact force to transfer from the tool to the technician. Specifically, the impact forces transfer from the tool to the hand, forearm and elbow of the technician. Given the number of repetitions and the number of flanges, these impact forces may create discomfort in the hand, forearm or elbow of the technician.

Second, conventional impact tools require the technician to orient the hand and forearm in an awkward position. This awkward position prevents the technician from applying the maximum possible amount of force to the impact tool. This requires the technician to actuate the impact tool a greater number of times to dislodge the flanges. Furthermore, the awkward position may also have an effect on the aforementioned discomfort with the technician.

Third, conventional impact tools can also pinch the technician. When grasping the impact tool, part of the technician's hand could extend past the slider. This portion of the technician's hand could contact the stop during actuation of the impact tool. Since the slider is weighted, this pinching can also cause discomfort with the technician.

BRIEF SUMMARY OF THE INVENTION

It is an object of the present invention to provide an improved impact tool.

It is a further object of the present invention to provide an ergonomic impact tool.

It is a further object of the present invention to provide an impact tool that isolates impact forces from the user.

It is a further object of the present invention to provide an impact tool that allows the user to actuate the tool from a less awkward position.

It is a further object of the present invention to provide an impact tool that allows the user to actuate the tool from a normal position.

It is a further object of the present invention to provide an impact tool that does not tend to pinch the user.

It is a further object of the present invention to provide an impact tool that allows the user to apply a greater amount of force thereto.

It is a further object of the present invention to provide an impact tool that allows the user to reduce the number of actuation repetitions.

These and other objects of the present invention are achieved in another aspect by an impact tool. The impact tool comprises: a shaft; a stop on the shaft; a slider movable on the shaft for striking the stop and creating an impact force; and a handle on the slider to allow a user to move the slider. The handle is isolated from the impact force.

These and other objects of the present invention are achieved in one aspect by an impact tool. The tool comprises: a shaft; a stop on the shaft; a slider movable on the shaft for striking the stop to create an impact force; and a handle movably attached to the slider to allow a user to move the slider.

These and other objects of the present invention are achieved in another aspect by a slider for an impact tool. The slider comprises: a sleeve; and a handle movably attached to the sleeve to allow a user to move the slider.

BRIEF DESCRIPTION OF THE DRAWINGS

Other uses and advantages of the present invention will become apparent to those skilled in the art upon reference to the specification and the drawings, in which.

DETAILED DESCRIPTION OF THE INVENTION

Figure 1:
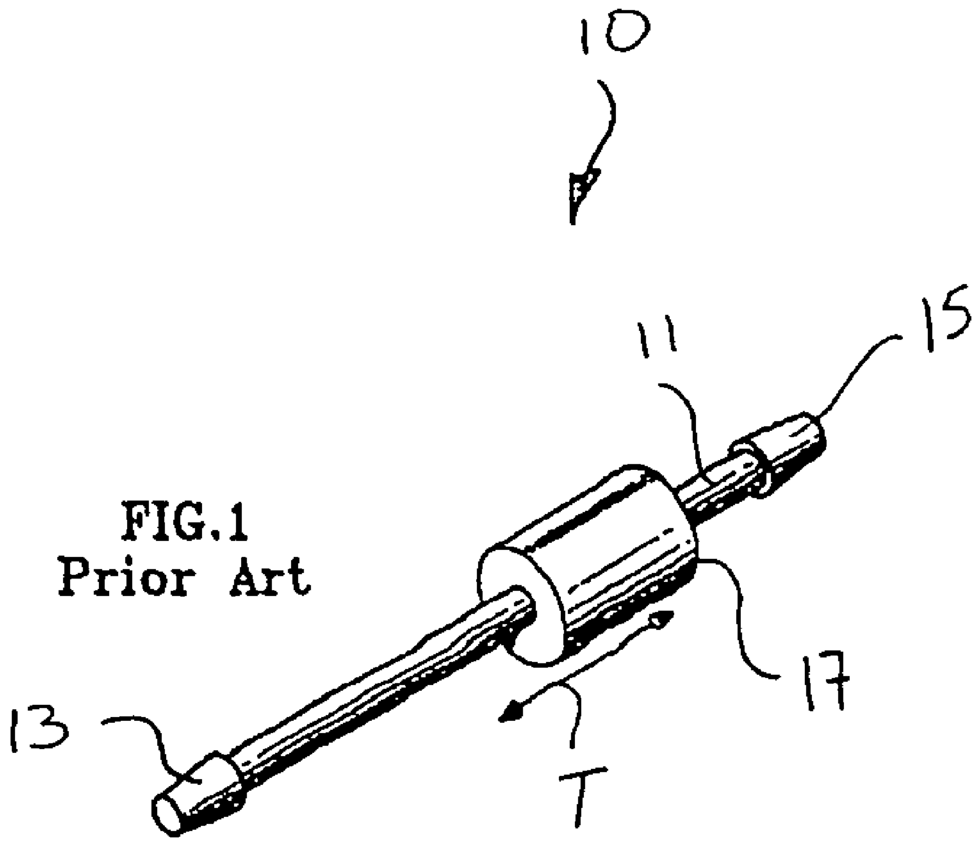
FIG.1 Prior Art
FIG. 1 is a perspective view of a conventional impact tool.

FIG. 1 displays a conventional impact tool 10. The tool 10 includes a shaft 11 with a stop 13 at one end and a head 15 at the other end. The head 15 is used to mount the tool 10 to an object (not shown) in any known fashion.

The tool 10 also includes a slider 17 that can move along the shaft 11 between the stop 13 and the head 15 along arrow T. The user grasps the slider 17 to actuate the tool 10. The slider 17 has sufficient mass to provide an impact force to the tool 10 when the user drives the slider 17 against the stop 13.

As discussed above, the tool 10 several drawbacks. First, the tool 10 allows the transfer of the impact force to the user through the slider. Since the user grasps the slider 17 during actuation, the impact force travels directly to the hand, forearm and elbow of the user.

Second, the tool 10 places the hand and forearm of the user in an awkward position. The position is awkward since the hand and forearm are not in a normal orientation. In essence, the hand and forearm of the user extend in a direction perpendicular to the actuation direction (i.e. arrow T) of the slider 17. Although not shown, the user typically stands at a location behind the stop 13 to actuate the tool 10.

Third, the hand of the user can pinch between the slider 17 and the stop 13 (or even the head 15) during actuation.

Figure 2:
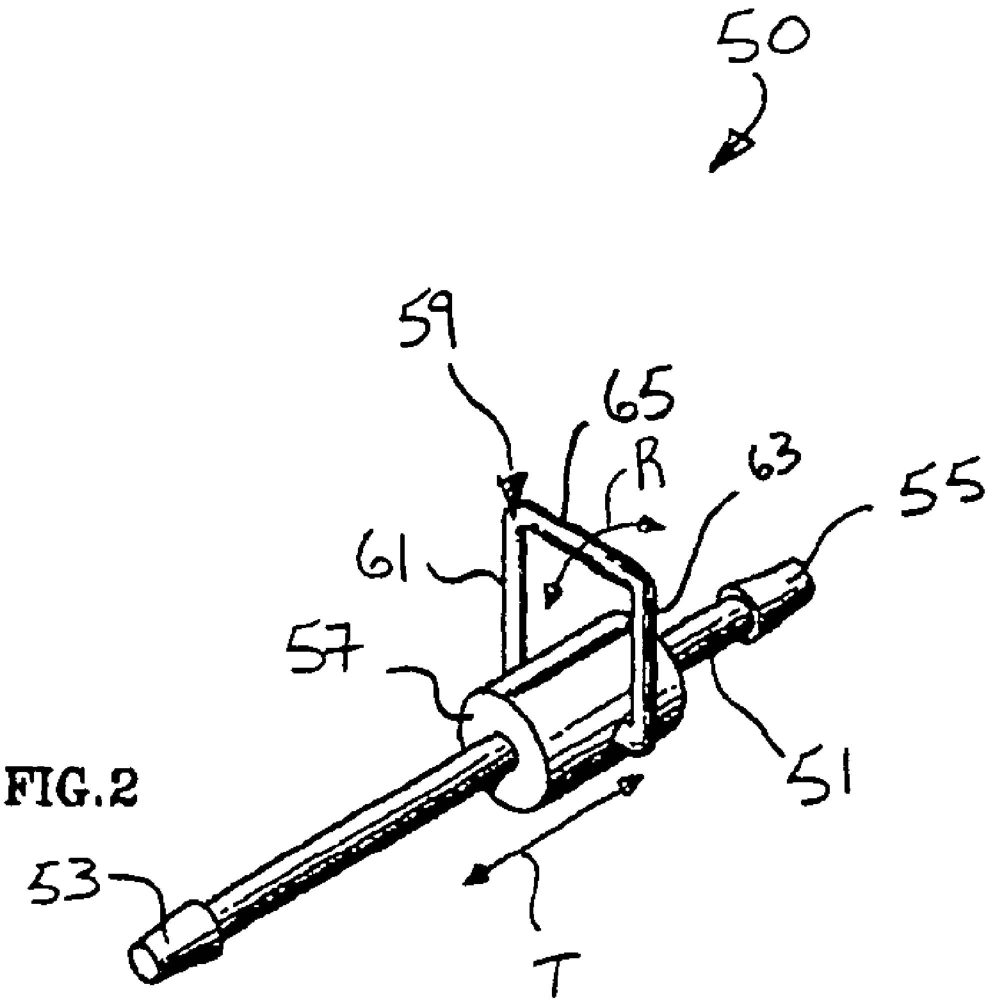
FIG. 2 is a perspective view of one embodiment of an impact tool of the present invention.

FIG. 2 displays one embodiment of an impact tool 50 of the present invention. The tool 50 can include similar components as the conventional tool 10. Namely, the tool 50 includes a shaft 51 with a stop 53 at one end and a head 55 at the other end, and a slider 57 that can move along the shaft 51 between the stop 53 and the head 55 along arrow T. In essence, the slider 57 is a weighted sleeve that surrounds the shaft 51.

Differently than the conventional tool 10, the tool 50 of the present invention includes a handle 59 movably attached to the slider 57. The user grasps the handle 59 to actuate the tool 50.

The handle 59 could be made from wire, with a pair of legs 61, 63 and a central section 65 connecting the legs 61, 63. The central section 65 extends in a direction transverse to the actuation direction (i.e. arrow T) of the slider 57. When grasping the central section 65, the hand and forearm of the user is in a natural position.

The handle 59 can pivotally mount to the slider 57 in any known manner. Preferably, the handle 59 rotatably mounts to the slider 57. For example, the legs 61, 63 can extend into openings (not shown) in the slider 57. The handle 59 can move relative to the slider 57 along arrow R. Alternatively, each leg 61, 63 of the handle 59 could attach to a boss (not shown) on the slider 57 (similar to a paint can). The end of each leg 61, 63 could encircle a fastener (not shown) secured to the slider 57. Finally, the handle 59 could be clamped (not shown) to the slider 57.

Since the handle 59 does not rigidly mount to the slider 57, the impact force created when the slider 57 impacts the stop 53 does not reach the user. In other words, the handle 59 is impact isolated from the rest of the tool 50.

Also note that the central section 65 of the handle 59 is located a distance away from the slider 57. This arrangement helps prevent pinching of the hand of the user between the slider 57 and the stop 53.

Figure 3:
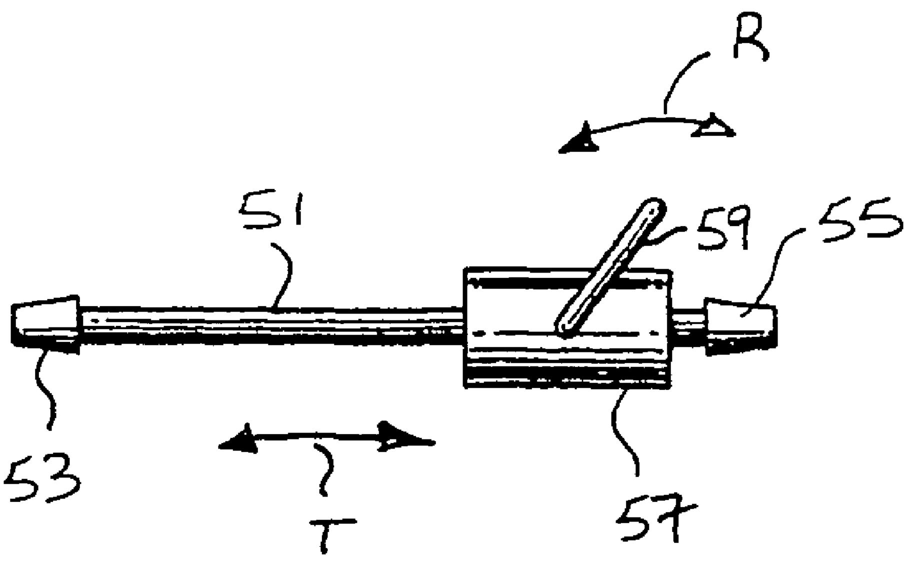
FIG. 3 is a side view of the impact tool of FIG. 2 in a first position.
Figure 4:
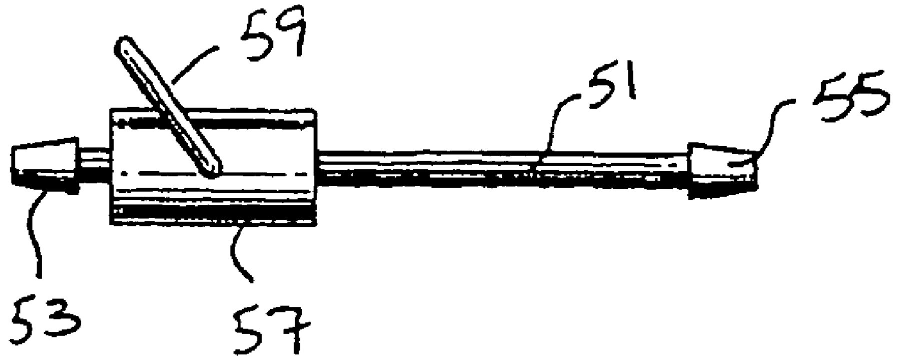
FIG. 4 is a side view of the impact tool of FIG. 2 in a second position.

FIGS. 3 and 4 display the tool 50 during actuation by the user. Before actuating the tool 50, the user must attach the tool 50 to the desired object. As discussed above, the desired object could be a flange (not shown) of an IGT case (not shown). The user attaches the tool 50 in any know manner.

FIG. 3 displays the tool 50 at an initial position with the slider 57 adjacent the head 55. To actuate the slider 57, the user grasps the handle 59 (i.e. central section 65) and pulls. The handle 59 will rotate along arrow R to a position oriented towards the user. The slider 57 will also begin to travel along the shaft 51 towards the stop 53.

The user continues to pull the handle 59 until the slider 57 collides with the stop 53. Since the handle 59 pivotally mounts to the slider 57, the force of the impact will neither transfer to the handle 59 nor to the user. FIG. 4 shows the tool 50 after colliding with the stop 53. The slider 57 is located adjacent the stop 53.

To return the tool 50 to the initial position shown in FIG. 3, the user must now move the slider 57 in the opposite direction. The user pushes on the handle 59, causing the handle 59 to rotate along arrow R to a position oriented away from the user. The slider 57 will then begin to travel along the shaft 51 towards the head 55. The user can either allow the slider 57 to collide with the head 55 or stop the slider 57 short of the head 55.

As desired, the user can repeat the above process any number of times to achieve a desired result. As discussed earlier, a desired result could be the successful removal of a flange (not shown) from an IGT case (not shown).

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. An impact tool, comprising:
a shaft;
a stop on said shaft;
a slider movable on said shaft for striking said stop to create an impact force;
a handle on said slider to allow a user to move said slider;
said handle comprising two legs extending from said slider and a central section extending between and joined to said legs;
a first one of said legs being connected to a first lateral side of said slider and a second one of said legs being connected to a second lateral side of said slider; and
wherein said handle moves relative to said slider when said slider strikes said stop to isolate said handle from said impact force.

2. The impact tool as recited in claim 1, wherein said handle is movably attached to said slider.

3. The impact tool as recited in claim 2, wherein said handle is rotatably attached to said slider.

4. The impact tool as recited in claim 1, wherein the user can grasp said handle with the wrist in the normal position.

5. The impact tool as recited in claim 4, wherein said handle forms a gripping section located a distance away from said slider.

6. The impact tool as recited in claim 5, wherein said slider moves along said shaft in a direction, and said gripping section extends transverse to said direction.

7. An impact tool, comprising:
a shaft;
a stop on said shaft;
a slider movable on said shaft for striking said stop to create an impact force, said slider having a first end and a second end;
a handle movably attached to said slider to allow a user to move said slider and said handle being moveable relative to said slider from a first position in proximity to said first end to a second position in proximity to said second end when said slider strikes said stop; and
said handle having a first leg joined to said slider, a second leg joined to said slider, and a central section extending between and joined to said first and second legs and moveable between said first and second ends.

8. The impact tool as recited in claim 7, wherein said handle is rotatably attached to said slider.

9. The impact tool as recited in claim 7, wherein the user can grasp said handle with the wrist in a normal position.

10. The impact tool as recited in claim 9, wherein said handle forms a gripping section located a distance away from said slider.

11. The impact tool as recited in claim 10, wherein said slider moves along said shaft in a direction and said gripping means extends transverse to said direction.

12. A slider for an impact tool, comprising:
a sleeve; and
a handle movably attached to said sleeve to allow a user to move said slider, said handle being formed by a first leg joined to a first lateral side of said sleeve, a second leg joined to a second lateral side of said sleeve, and a central section extending between and being joined to said first and second legs;
wherein said handle moves relative to said slider when said slider strikes a stop on said impact tool to isolate said handle from a force created by said slider striking said stop.

13. The slider as recited in claim 12, wherein said handle is rotatably attached to said sleeve.

14. The slider as recited in claim 12, wherein the user can grasp said handle with the wrist in a normal position.

15. The slider as recited in claim 12, wherein said handle forms a gripping section located a distance away from said slider.

16. The slider as recited in claim 15, wherein said impact tool has a shaft, said slider is adapted to move along said shaft in a direction, and said gripping section extends transverse to said direction.

17. An ergonomic tool, comprising:

a shaft;

a stop on said shaft;

a slider movable on said shaft in a direction for striking said stop to create an impact force, said slider having a first end and a second end and a longitudinal axis;

a handle on said slider to allow a user to move said slider, said handle having a first leg rotatably connected to a first lateral side of said slider, a second leg rotatably connected to a second lateral side of said slider, and a central section forming a gripping section extending transverse to said direction;

said central section extending between and being joined to said first and second legs; and wherein said handle moves relative to said slider the user moves said slider towards and away from said stop; and wherein said user can grasp said handle with the wrist in a normal position.

* * * * *